US012059860B2

(12) United States Patent
Lin

(10) Patent No.: US 12,059,860 B2
(45) Date of Patent: Aug. 13, 2024

(54) METHOD FOR FORMING PRODUCT OF COMPRESSIBLE MATERIAL BY MOLDING DEVICE

(71) Applicant: KEMFLO INTERNATIONAL CO., LTD., Pingtung (TW)

(72) Inventor: Sheng-Nan Lin, Pingtung (TW)

(73) Assignee: KEMFLO INTERNATIONAL CO., LTD., Pingtung (TW)

( * ) Notice: Subject to any disclaimer, the term of this patent is extended or adjusted under 35 U.S.C. 154(b) by 551 days.

(21) Appl. No.: 17/412,476

(22) Filed: Aug. 26, 2021

(65) Prior Publication Data

US 2023/0061600 A1 Mar. 2, 2023

(51) Int. Cl.

*B30B 11/02* (2006.01)
*B30B 15/30* (2006.01)
*B30B 15/34* (2006.01)

(52) U.S. Cl.

CPC .......... *B30B 11/027* (2013.01); *B30B 15/302* (2013.01); *B30B 15/34* (2013.01)

(58) Field of Classification Search

CPC ....... B30B 11/027; B30B 11/24; B30B 11/26; B30B 15/30; B30B 15/302; B30B 15/308

See application file for complete search history.

(56) References Cited

U.S. PATENT DOCUMENTS 3,309,445 A * 3/1967 Haller .................. B30B 11/001 264/119
3,867,077 A * 2/1975 Deprez ............... B30B 15/0023 425/451.2
4,380,473 A * 4/1983 Lichtinghagen ........ B30B 11/26 425/408
6,868,778 B2 * 3/2005 Knoth .................. B30B 15/306 425/130
7,361,301 B2 * 4/2008 Bauer .................. B30B 11/005 419/66

* cited by examiner

*Primary Examiner* — Thu Khanh T. Nguyen

(74) *Attorney, Agent, or Firm* — Chun-Ming Shih; LANWAY IPR SERVICES

(57) ABSTRACT

A method for forming a product of compressible material includes preparing compressible material, assembling a molding fixture, filling the compressible material into a filling tube of the molding fixture, clamping the filling tube by a clamping mechanism of the molding fixture, moving an adjusting screw of the molding fixture downward in the filling tube to compress the compressible material, delivering the molding fixture to a heating module to perform a heating process so that the compressible material is heated and melted, delivering the molding fixture to a cooling module to perform a cooling process so that the compressible material is cooled and solidified to form a product, stripping the molding fixture from the product, and finishing and taking out the product of the compressible material.

10 Claims, 6 Drawing Sheets a5

METHOD FOR FORMING PRODUCT OF COMPRESSIBLE MATERIAL BY MOLDING DEVICE

BACKGROUND OF THE INVENTION

1. Field of the Invention

The present invention relates to a molding method and, more particularly, to a method for forming and making a product of compressible material by using a molding device.

2. Description of the Related Art

A conventional method for molding compressible material, such as a carbon bar, comprises filling the compressible material into a die, compressing the compressible material by a hydraulic cylinder, delivering the compressible material to a heating furnace to perform a sintering process, cooling the compressible material during a long period of time, and stripping the compressible material from the die to finish a product of the compressible material. However, the hydraulic cylinder cannot control the compression amount of the compressible material so that the volume of the compressible material is easily changed. In addition, the heating furnace has to heat the compressible material during a long period of time, thereby increasing the working time and the cost of fabrication. Further, the compressible material is cooled during a long period of time, thereby increasing the working time and the cost of fabrication. Further, the compressible material is stripped from the die by the hydraulic cylinder so that the adhesive is easily adhered to the hydraulic cylinder, and the powder easily spills outward.

BRIEF SUMMARY OF THE INVENTION

In accordance with the present invention, there is provided a method for forming a product of compressible material, comprising:

a first step including:

a first substep of preparing compressible material;

a second substep of assembling a molding fixture that includes a base provided with a biasing mechanism, a bearing set arranged above the base, a filling tube arranged between the bearing set and the base and provided with a molding chamber, a pole disposed in the filling tube, an adjusting screw mounted on the bearing set and movable in the filling tube, and a clamping mechanism arranged outside the filling tube;

a third substep of filling the compressible material into the molding chamber of the filling tube;

a fourth substep of clamping the filling tube by the clamping mechanism; and a fifth substep of driving and moving the adjusting screw downward in the molding chamber of the filling tube to compress the compressible material;

a second step of delivering the molding fixture to a heating module to perform a heating process to the molding fixture so that the compressible material in the molding chamber of the filling tube is heated and melted;

a third step of delivering the molding fixture to a cooling module to perform a cooling process to the molding fixture so that the compressible material in the molding chamber of the filling tube is cooled and solidified to form a product;

a fourth step of stripping the molding fixture from the product; and a fifth step of finishing and taking out the product of the compressible material.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

Figure 1:
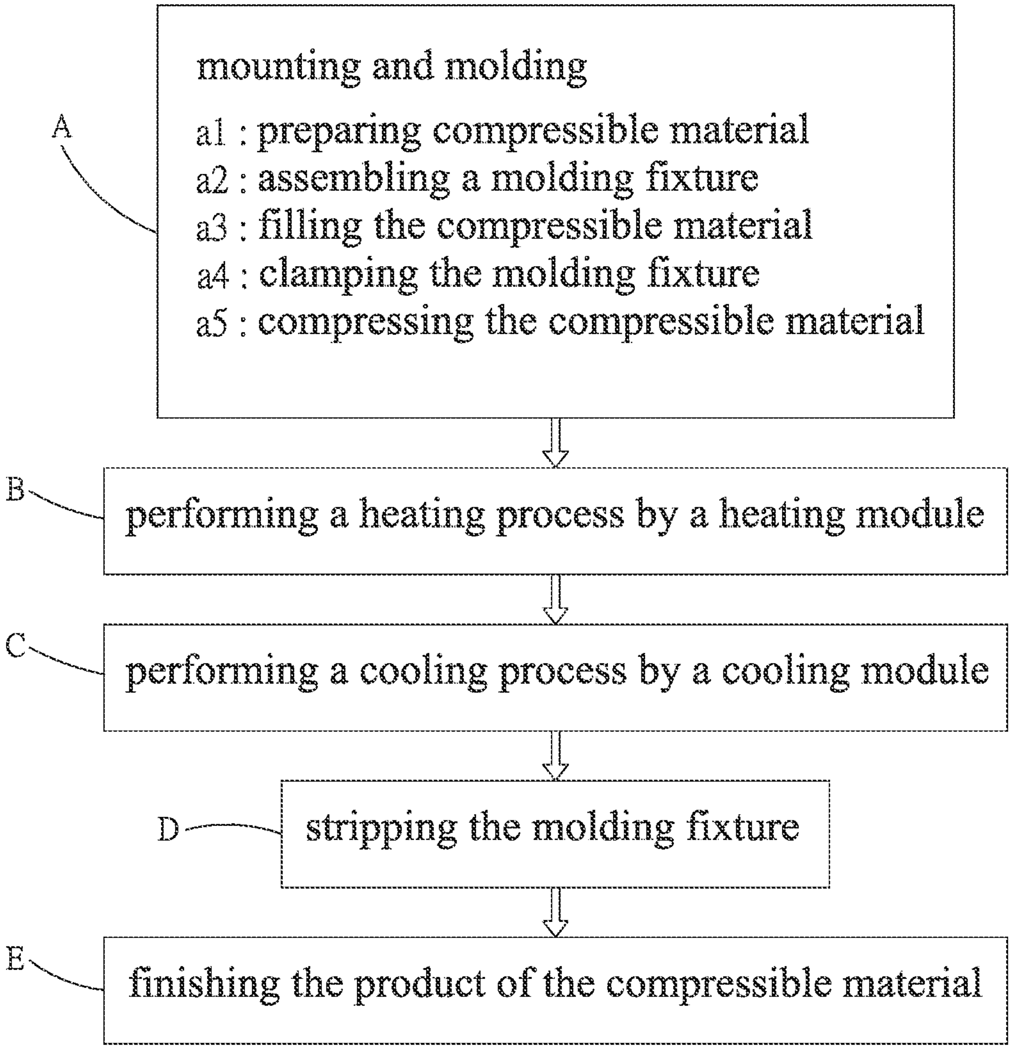
FIG. 1 is a block diagram showing a flow chart of a method for forming a product of compressible material in accordance with the preferred embodiment of the present invention.
Figure 2:
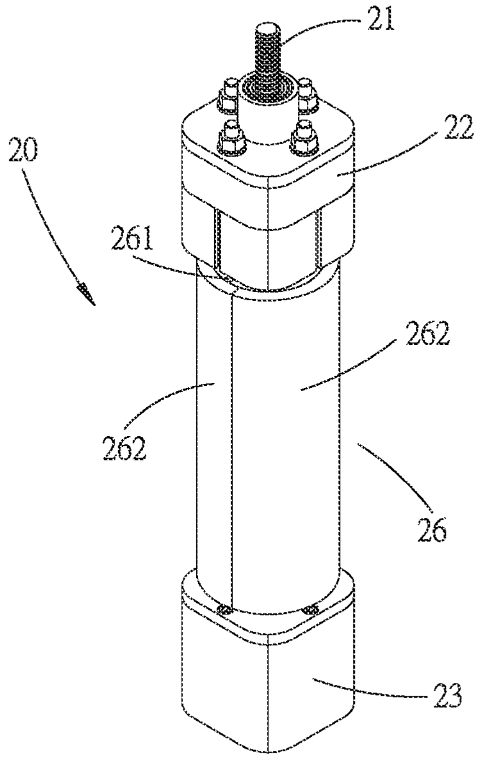
FIG. 2 is a perspective view of a molding fixture of a molding device in accordance with the preferred embodiment of the present invention.
Figure 3:
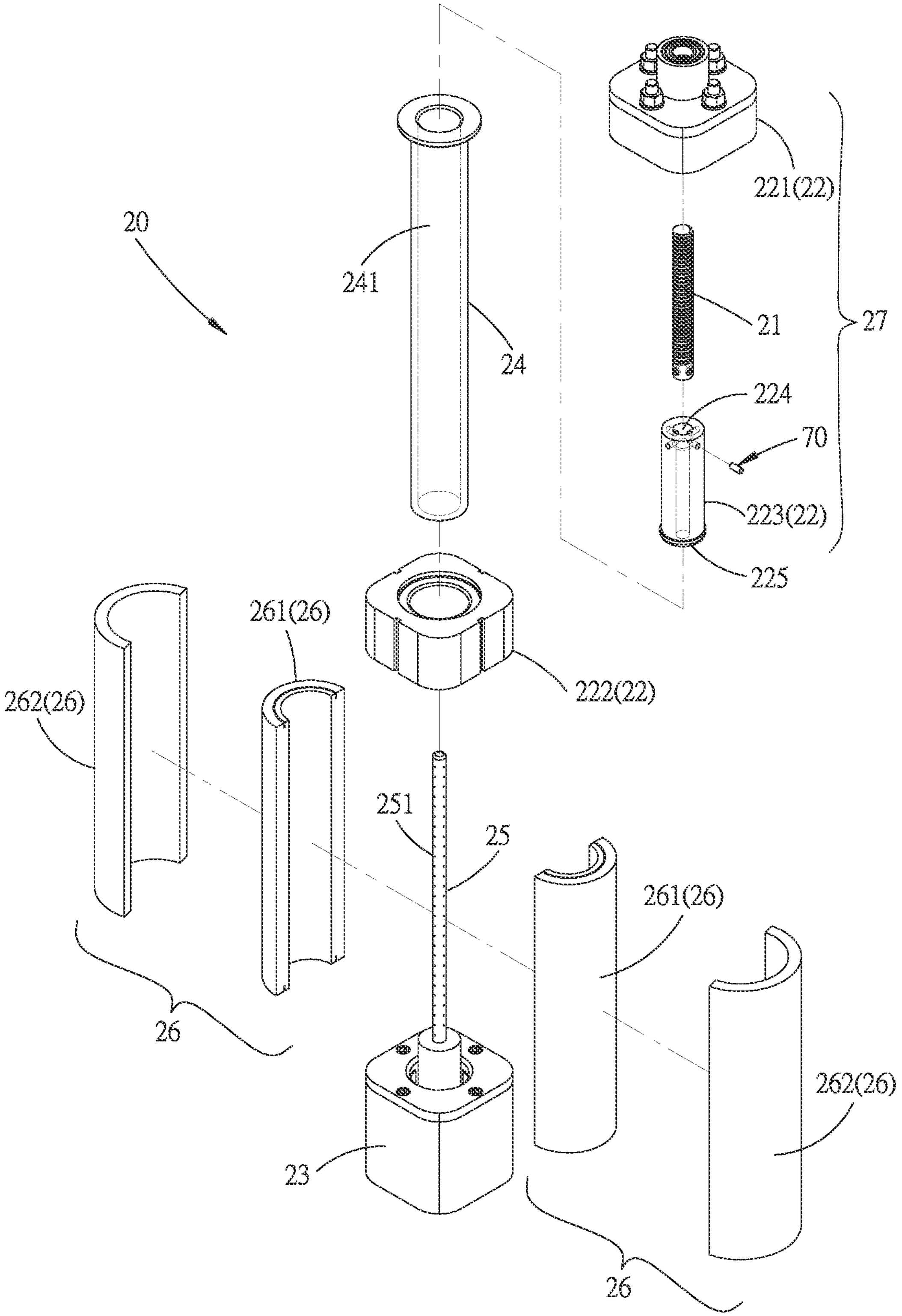
FIG. 3 is an exploded perspective view of the molding fixture in accordance with the preferred embodiment of the present invention.
Figure 4:
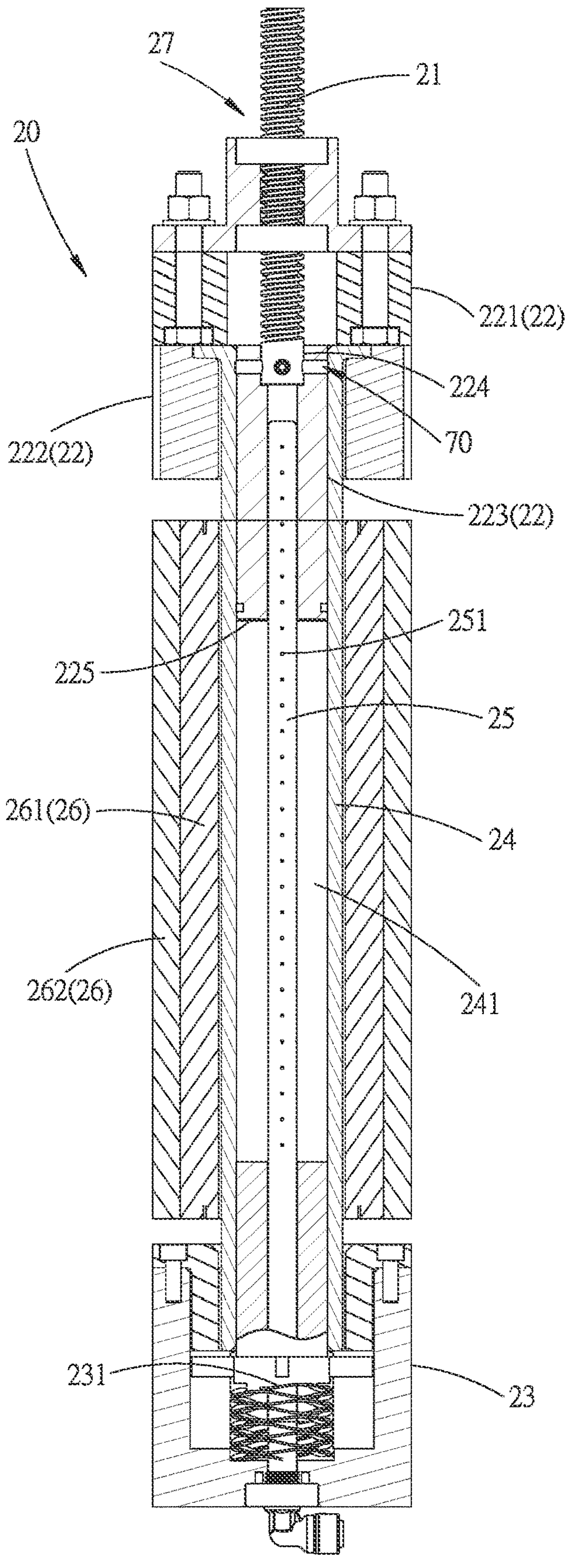
FIG. 4 is a cross-sectional view of the molding fixture as shown in FIG. 2.
Figure 5:
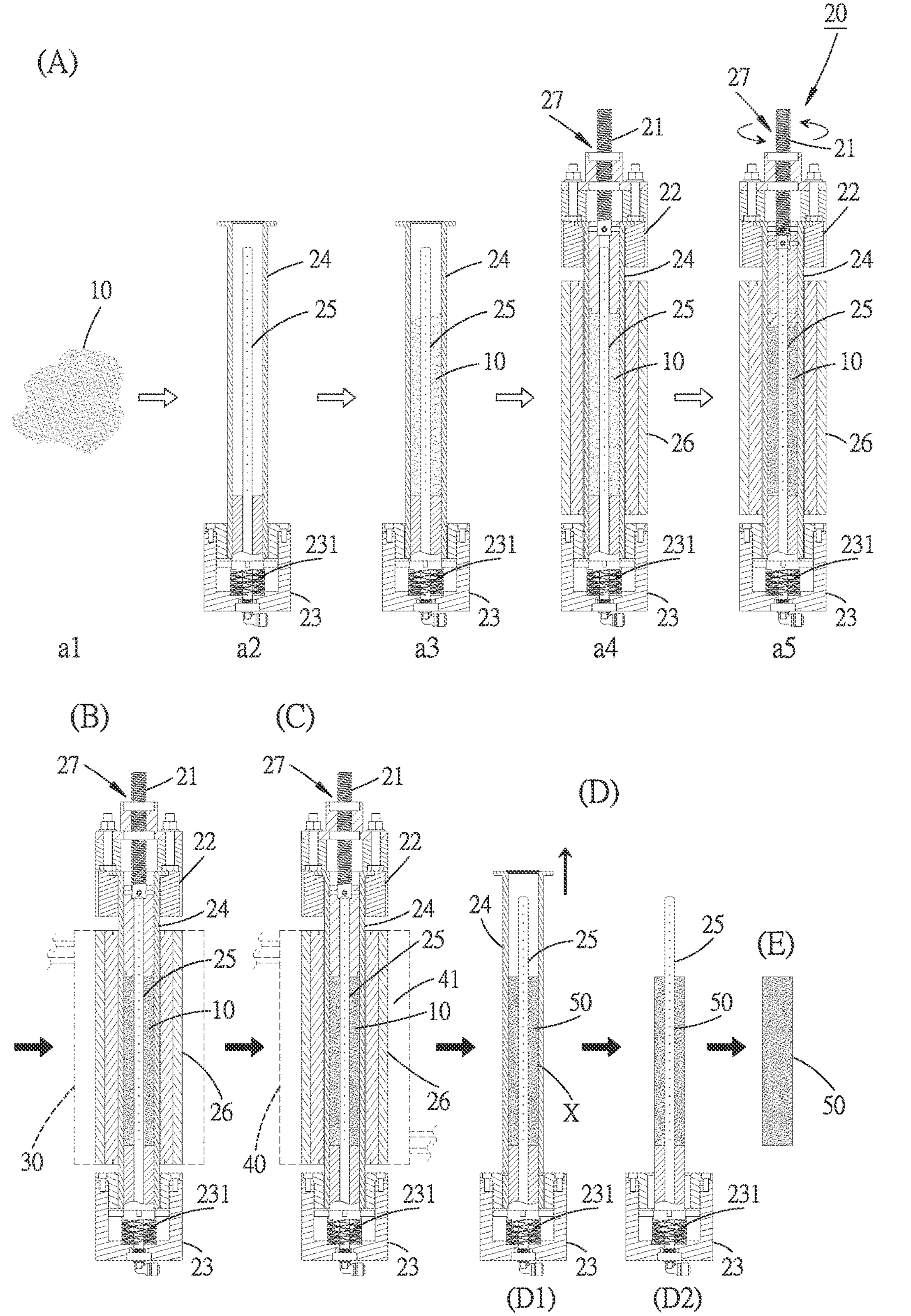

FIG. 5 presents multiple cross-sectional views showing a flow chart of the method for forming a product of compressible material in accordance with the preferred embodiment of the present invention.

Figure 6:
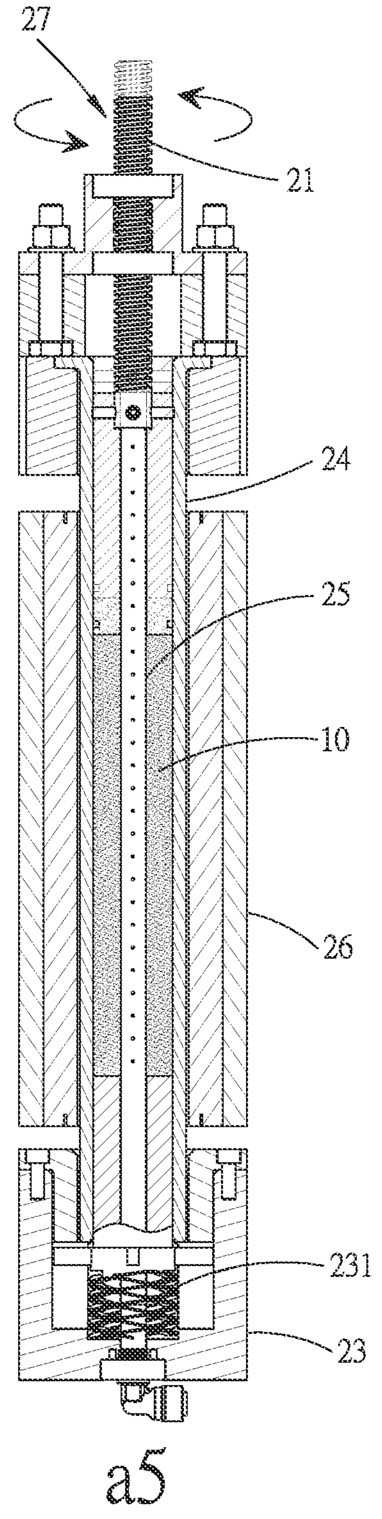

FIG. 6 is a locally enlarged view of the molding fixture in a fifth substep as shown in FIG. 5.

DETAILED DESCRIPTION OF THE INVENTION

Referring to FIGS. 2-5, a molding device in accordance with the preferred embodiment of the present invention comprises a molding fixture 20, a heating module 30 removably arranged on the molding fixture 20, and a cooling module 40 removably arranged on the molding fixture 20.

The molding fixture 20 includes a base 23, a pole (or mandrel or core bar) 25 mounted on the base 23, a filling tube 24 mounted on the base 23 and surrounding the pole 25, a driving mechanism 27 mounted on the filling tube 24, and a clamping mechanism 26 mounted on the filling tube 24 and disposed between the driving mechanism 27 and the base 23.

The base 23 is provided with a biasing mechanism 231 biasing against the filling tube 24 and the pole 25. The filling tube 24 is made of metal with high heat conductivity and has an interior provided with a molding chamber 241 having a cylindrical shape. The filling tube 24 has a lower end mounted on the base 23. The filling tube 24 is arranged between the driving mechanism 27 and the biasing mechanism 231. The pole 25 is disposed in and covered by the molding chamber 241 of the filling tube 24. The driving mechanism 27 is electrically connected with an actuator (such as a motor) and includes a bearing set 22 mounted on an upper end of the filling tube 24, and an adjusting screw 21 mounted on the bearing set 22 and connected with the actuator.

The bearing set 22 is provided with an internal thread. The filling tube 24 is arranged between the bearing set 22 and the biasing mechanism 231 of the base 23. The adjusting screw 21 is screwed through the internal thread of the bearing set 22. The adjusting screw 21 is driven and rotated by the actuator. Thus, when the adjusting screw 21 is rotated, the adjusting screw 21 is moved upward or downward relative to the bearing set 22. The bearing set 22 includes an upper bearing 221, a lower bearing 222 combined with the upper bearing 221, and a push member (or press member or piston or locking mechanism) 223 secured to the adjusting screw 21 and movably mounted in the filling tube 24. The internal thread of the bearing set 22 is formed on the upper bearing 221 and screwed onto the adjusting screw 21. The upper end of the filling tube 24 is sandwiched between the upper bearing 221 and the lower bearing 222. The push member 223 is arranged at a center of the bearing set 22 and has a hollow interior allowing insertion of the pole 25. The push member 223 is inserted into the upper end of the filling tube 24. The push member 223 has an upper end provided with a connecting portion 224 secured to a lower end of the adjusting screw 21 by a fastener 70 so that the push member 223 is moved with the adjusting screw 21 synchronously. The push member 223 has a lower end provided with a dustproof flange (or an O-ring) 225 pressing an inner wall of the filling tube 24 to prevent powder from leaking outward. Thus, the push member 223 is rotated by and moved with the adjusting screw 21 and is movable in the molding chamber 241 of the filling tube 24 by rotation of the adjusting screw 21.

The clamping mechanism 26 includes a first clamping member 261 covering and clamping an exterior of the filling tube 24 and a second clamping member 262 covering and clamping an exterior of the first clamping member 261. The first clamping member 261 functions as an inner sleeve and a heating member and includes two semi-cylindrical shells detachably connected with each other. The second clamping member 262 functions as an outer sleeve and includes two semi-cylindrical shells detachably connected with each other.

The heating module 30 is connected with an electric control device to provide a heat conduction. The heating module 30 is preferably kept at a constant temperature of 200° C. In practice, the molding fixture 20 is delivered to the heating module 30 to perform the heating process.

The cooling module 40 is connected with an air pipeline of an air pressure device to provide a cooling effect. In practice, the molding fixture 20 is delivered to the cooling module 40 to perform the cooling process.

Referring to FIGS. 1-6, a method for forming a product of compressible material in accordance with the preferred embodiment of the present invention comprises a first step (A) of mounting and molding, including a first substep (a1) of preparing compressible material 10, a second substep (a2) of assembling a molding fixture 20 that includes a base 23 provided with a biasing mechanism 231, a bearing set 22 arranged above the base 23, a filling tube 24 arranged between the bearing set 22 and the base 23 and provided with a molding chamber 241, a pole 25 disposed in the filling tube 24, an adjusting screw 21 mounted on the bearing set 22 and movable in the filling tube 24, and a clamping mechanism 26 arranged outside the filling tube 24, a third substep (a3) of filling the compressible material 10 into the molding chamber 241 of the filling tube 24, a fourth substep (a4) of clamping the filling tube 24 by the clamping mechanism 26, and a fifth substep (a5) of driving and moving the adjusting screw 21 downward in the molding chamber 241 of the filling tube 24 to compress the compressible material 10, a second step (B) of delivering the molding fixture 20 to a heating module 30 to perform a heating process to the molding fixture 20 so that the compressible material 10 in the molding chamber 241 of the filling tube 24 is heated and melted, a third step (C) of delivering the molding fixture 20 to a cooling module 40 to perform a cooling process to the molding fixture 20 so that the compressible material 10 in the molding chamber 241 of the filling tube 24 is cooled and solidified to form a product 50, a fourth step (D) of stripping the molding fixture 20 from the product 50, and a fifth step (E) of finishing and taking out the product 50 of the compressible material 10.

In the first substep (a1), the compressible material 10 is mixed with an adhesive at a predetermined proportion according to the requirement. The adhesive includes PE powder, plastic powder or the like.

In the fourth substep (a4), the clamping mechanism 26 withstands the expansion force applied on the filling tube 24 during compression of the compressible material 10.

In the a fifth substep (a5), the compressible material 10 is arranged and compressed between the adjusting screw 21 and the biasing mechanism 231. The biasing mechanism 231 is compressed and retracted by the compressible material 10 to adjust the volume variation of the compressible material 10. The compressible material 10 has a compact structure by compression of the adjusting screw 21.

In the third step (C), the cooling module 40 delivers cold air to the molding fixture 20, so that the cold air is circulated in the interior room 41 of the cooling module 40 and carries hot air outward from the molding fixture 20 to enhance the cooling effect.

The fourth step (D) includes a first substep (D1) of removing the clamping mechanism 26 and the bearing set 22 from the filling tube 24, and a second substep (D2) of removing the filling tube 24 from the base 23 by a restoring force of the biasing mechanism 231, to finish the stripping process. Thus, the biasing mechanism 231 provides an assistant elastic force to the filling tube 24 so that the filling tube 24 is removed from the base 23 quickly. In the fourth step (D), a clearance X is formed between the compressible material 10 and the molding chamber 241 of the filling tube 24 due to thermal expansion and contraction produced during the second step (B) and the third step (C) so that the molding fixture 20 is stripped from the product 50 easily and quickly.

In the preferred embodiment of the present invention, the pole 25 is provided with a plurality of air holes 251 connected to an air exhaust device to drain excessive gas and to prevent the adhesive from adhering to the filling tube 24. Thus, the pole 25 has an air exhaust effect by the air holes 251 to reduce the powder dust.

In the preferred embodiment of the present invention, the biasing mechanism 231 includes an elastic member, such as a spring.

In the preferred embodiment of the present invention, the biasing mechanism 231 provides a pretension and a balance compression force.

In the preferred embodiment of the present invention, the compressible material 10 includes activated carbon, carbon fiber or filter material. The compressible material 10 is melted at a high temperature, is cured when being cooled, and may be compressed to form a lump.

Accordingly, the molding fixture 20 has a high heat conductive feature to conduct the heat from the heating module 30 quickly so as to enhance the heating effect of the heating module 30. In addition, the heating module 30 heats the compressible material 10 rapidly in the molding chamber 241 of the filling tube 24 to shorten the melting time of the compressible material 10. Further, the cooling module 40 dissipates the heat in the molding fixture 20 quickly so that the compressible material 10 is cooled and solidified rapidly. Further, a clearance X is formed between the compressible material 10 and the molding chamber 241 of the filling tube 24 by thermal expansion and contraction produced during the heating and cooling processes so that the molding fixture 20 is stripped from the product 50 easily and quickly. Further, the biasing mechanism 231 provides an assistant elastic force to the filling tube 24 so that the filling tube 24 is removed from the base 23 quickly. Further, the molding device greatly reduces the working time for heating and molding the compressible material 10, to largely shorten the time for manufacturing the product 50 of the compressible material 10, to increase the productivity and quality of the product 50, and to decrease the cost of production.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A method for forming a product of compressible material, comprising:

a first step including:

a first substep of preparing compressible material;

a second substep of assembling a molding fixture that includes a base provided with a biasing mechanism, a bearing set arranged above the base, a filling tube arranged between the bearing set and the base and provided with a molding chamber, a pole disposed in the filling tube, an adjusting screw mounted on the bearing set and movable in the filling tube, and a clamping mechanism arranged outside the filling tube;

a third substep of filling the compressible material into the molding chamber of the filling tube;

a fourth substep of clamping the filling tube by the clamping mechanism; and a fifth substep of driving and moving the adjusting screw downward in the molding chamber of the filling tube to compress the compressible material;

a second step of delivering the molding fixture to a heating module to perform a heating process to the molding fixture so that the compressible material in the molding chamber of the filling tube is heated and melted;

a third step of delivering the molding fixture to a cooling module to perform a cooling process to the molding fixture so that the compressible material in the molding chamber of the filling tube is cooled and solidified to form a product;

a fourth step of stripping the molding fixture from the product; and a fifth step of finishing and taking out the product of the compressible material.

2. The method as claimed in claim 1, wherein the pole is provided with a plurality of air holes connected to an air exhaust device to drain excessive gas, and the biasing mechanism includes a spring.

3. The method as claimed in claim 1, wherein the biasing mechanism provides a pretension and a balance compression force.

4. The method as claimed in claim 1, wherein the clamping mechanism includes a first clamping member clamping an exterior of the filling tube and a second clamping member clamping an exterior of the first clamping member, the first clamping member functions as an inner sleeve and includes two semi-cylindrical shells detachably connected with each other, and the second clamping member functions as an outer sleeve and includes two semi-cylindrical shells detachably connected with each other.

5. The method as claimed in claim 4, wherein the first clamping member is a heating member.

6. The method as claimed in claim 1, wherein the filling tube is made of metal with high heat conductivity.

7. The method as claimed in claim 1, wherein the adjusting screw is driven and rotated by an actuator.

8. The method as claimed in claim 1, wherein the compressible material includes activated carbon, carbon fiber or filter material.

9. The method as claimed in claim 1, wherein the bearing set includes a push member secured to the adjusting screw and movably mounted in the filling tube, and the push member has an upper end secured to a lower end of the adjusting screw and a lower end provided with a dustproof flange.

10. The method as claimed in claim 1, wherein the fourth step includes:

removing the clamping mechanism and the bearing set from the filling tube; and removing the filling tube from the base by a restoring force of the biasing mechanism.

* * * * *